United States Patent
Westrick et al.

(10) Patent No.: US 8,462,062 B2
(45) Date of Patent: Jun. 11, 2013

(54) RF PASSIVE REPEATER FOR A METAL CONTAINER

(75) Inventors: Michael D. Westrick, Fort Wayne, IN (US); Daniel L. Sands, Warsaw, IN (US)

(73) Assignee: Solstice Medical, LLC, Fort Wayne, IN (US)

( * ) Notice: Subject to any disclaimer, the term of this patent is extended or adjusted under 35 U.S.C. 154(b) by 284 days.

(21) Appl. No.: 11/747,637

(22) Filed: May 11, 2007

(65) Prior Publication Data

US 2007/0262868 A1   Nov. 15, 2007

Related U.S. Application Data

(60) Provisional application No. 60/800,093, filed on May 12, 2006.

(51) Int. Cl.
*H01Q 11/02* (2006.01)
*H01Q 3/00* (2006.01)
*H01Q 13/10* (2006.01)
*H01Q 1/48* (2006.01)
*G08B 13/14* (2006.01)

(52) U.S. Cl.
USPC ............ 343/731; 340/572.4; 340/572.1; 340/572.7; 340/572.8; 343/845; 343/762; 343/771

(58) Field of Classification Search
USPC ....... 340/572.7, 539.1, 572.1, 572.5; 343/731
See application file for complete search history.

(56) References Cited

U.S. PATENT DOCUMENTS

| | | | |
|---|---|---|---|
| 5,059,971 A * | 10/1991 | Blaese | 343/713 |
| 5,151,043 A * | 9/1992 | Morgan | 439/212 |
| 6,072,383 A | 6/2000 | Gallagher, III et al. | |
| 6,184,841 B1 | 2/2001 | Shober et al. | |
| 6,208,235 B1 | 3/2001 | Trontelj | |
| 6,275,157 B1 * | 8/2001 | Mays et al. | 340/572.5 |
| 6,445,297 B1 | 9/2002 | Nicholson | |
| 6,486,783 B1 * | 11/2002 | Hausladen et al. | 340/572.8 |
| 6,563,425 B2 | 5/2003 | Nicholson et al. | |
| 6,688,353 B1 * | 2/2004 | Koch | 152/152.1 |
| 6,696,954 B2 | 2/2004 | Chung | |
| 6,720,930 B2 | 4/2004 | Johnson et al. | |
| 6,731,904 B1 * | 5/2004 | Judd | 455/11.1 |
| 6,914,562 B2 | 7/2005 | Forster | |
| 6,943,688 B2 | 9/2005 | Chung et al. | |
| 6,963,317 B2 | 11/2005 | Zuk et al. | |
| 7,017,822 B2 | 3/2006 | Aisenbrey | |
| 7,019,651 B2 | 3/2006 | Hall et al. | |
| 7,394,361 B1 * | 7/2008 | Twitchell, Jr. | 340/539.1 |
| 2003/0025194 A1 * | 2/2003 | Gebauer et al. | 257/704 |
| 2003/0214774 A1 * | 11/2003 | Locatelli et al. | 361/118 |

(Continued)

FOREIGN PATENT DOCUMENTS

EP   1 630 730 A1   3/2006

*Primary Examiner* — Jennifer Mehmood
*Assistant Examiner* — Pameshanand Mahase
(74) *Attorney, Agent, or Firm* — Taylor IP, P.C.

(57) ABSTRACT

A storage container assembly includes a container having a metal side wall, and a passive wireless repeater mounted on the side wall. The repeater includes a first antenna on one side of the side wall, a second antenna on an opposite side of the side wall, and an electrical connection between the first antenna and the second antenna. The electrical connection may be in the form of a first connector mounted to the first antenna and a second connector mounted to the second antenna.

20 Claims, 2 Drawing Sheets

U.S. PATENT DOCUMENTS

| | | |
|---|---|---|
| 2005/0001785 A1* | 1/2005 | Ferguson et al. ............. 343/895 |
| 2005/0195082 A1* | 9/2005 | Morrison ................. 340/539.26 |
| 2006/0208899 A1* | 9/2006 | Suzuki et al. .............. 340/572.7 |
| 2006/0214775 A1* | 9/2006 | Watanabe et al. .......... 340/10.41 |
| 2007/0001809 A1* | 1/2007 | Kodukula et al. ............ 340/10.1 |
| 2007/0139202 A1 | 6/2007 | Austin |
| 2007/0171073 A1* | 7/2007 | Ariyoshi et al. ........... 340/572.7 |

* cited by examiner

RF PASSIVE REPEATER FOR A METAL CONTAINER

CROSS REFERENCE TO RELATED APPLICATIONS

This is a non-provisional application based upon U.S. provisional patent application Ser. No. 60/800,093, entitled "RF METALLIC ENCLOSURE PASSIVE REPEATER", filed May 12, 2006.

BACKGROUND OF THE INVENTION

1. Field of the Invention

The present invention relates to RFID tags, and, more particularly, to techniques for transmitting RF signals to and from such RFID tags.

2. Description of the Related Art

Radio frequency identification (RFID) tags are well known throughout industry, and are being increasingly utilized for supply chain management, inventory management, and logistic control. These tags can be written to and read from a handheld transceiver or fixed portal. Small low frequency tags are currently being utilized in surgical tools and implantable devices. These small tags are frequently carried in a metal enclosure with small holes designed to allow the tools or implants to be sterilized using a high heat autoclave process. The metal enclosure prohibits the RFID tags located on or in the tools and implants to be read inside the enclosure. In order to read the tags inside the enclosure, the lid must be opened and virtual contact (actual physical contact or less than ⅛ inch) must be made between the reader antenna and the surgical tool or implant device in order to read the RFID tag. This "virtual" contact requirement makes communication with a surgical implant device or a full set of surgical tools impossible without removal of the contents of the enclosure.

What is needed in the art is a way of transmitting RF signals to and from RFID tags located within a metal container.

SUMMARY OF THE INVENTION

The present invention provides an antenna assembly which allows an RF signal to pass through a metal container to or from RFID tags within the container.

The invention in one form is directed to a storage container assembly, including a container having a metal side wall, and a passive wireless repeater mounted on the side wall. The repeater includes a first antenna on one side of the side wall, a second antenna on an opposite side of the side wall, and an electrical connection between the first antenna and the second antenna. The electrical connection may be in the form of a first connector mounted to the first antenna and a second connector mounted to the second antenna.

An advantage of the present invention is that data can be transmitted to and read from the RFID tags within the metal enclosure without having to open or remove the tagged equipment from the enclosure.

Another advantage is that the repeater provides a highly durable and reliable mechanism to facilitate the ability to read the "RFID tagged" contents of a metal container.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
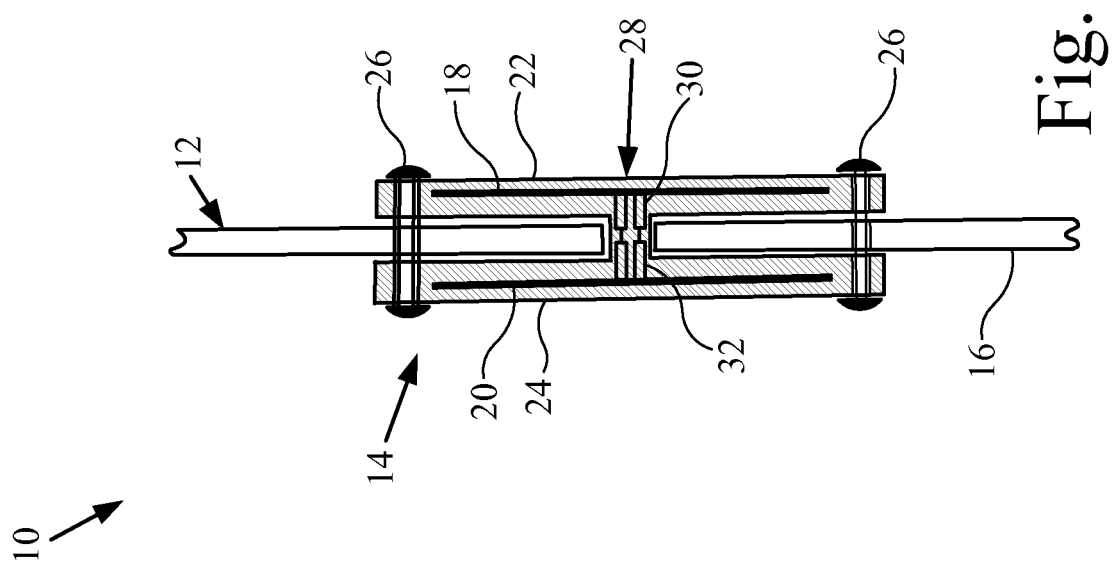
FIG. 1 is a fragmentary, sectional view of one embodiment of a storage container assembly of the invention.
Figure 2:
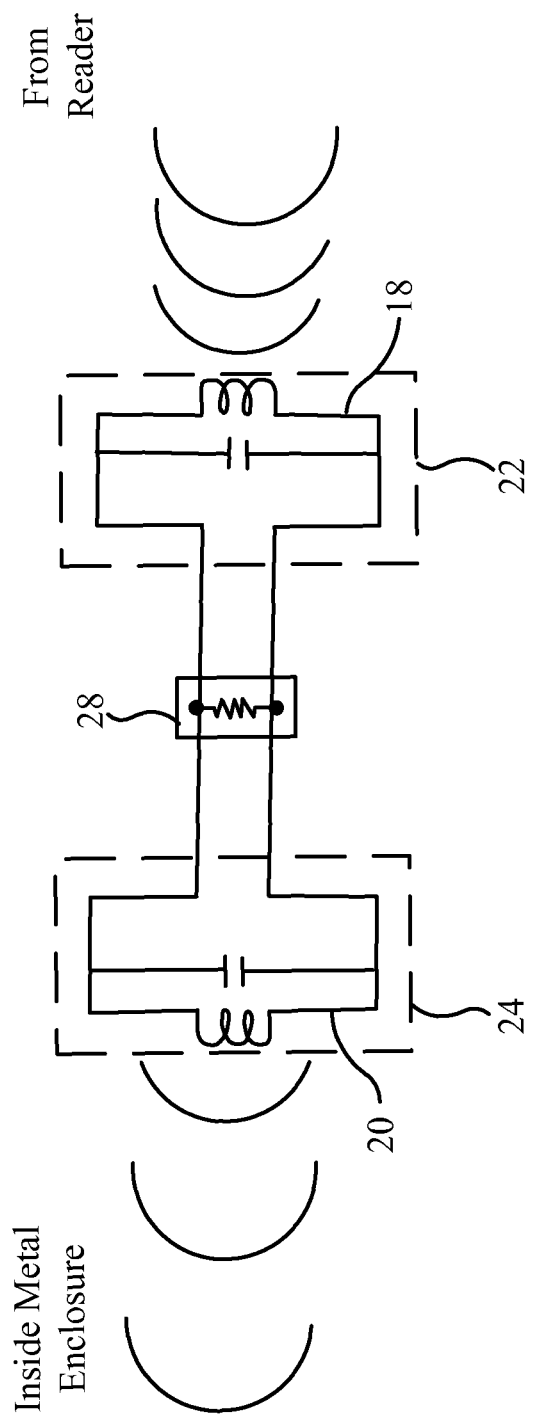
FIG. 2 is an electrical circuit diagram of the storage container assembly shown in FIG. 1.

Referring now to FIGS. 1 and 2, there is shown an embodiment of a storage container assembly 10 of the present invention which generally includes a metal container 12 and an antenna assembly in the form of a passive wireless repeater 14. Metal container 12 is preferably configured to hold orthopaedic instruments or implants, but may also be configured to hold any type of equipment carrying RFID tags. The term "container", as used herein, is intended to broadly mean any type of container, enclosure, case, tray, etc. with RFID tagged equipment therein. The term "equipment", as used herein, is intended to broadly mean any type of product which is tagged with RFID tags, such as orthopaedic instruments or implants, non-orthopaedic products, etc.

Container 12 includes a plurality of metal side walls 16, one of which is shown in FIG. 1. The term "side wall", as used herein, is intended to mean any wall of container 12. Passive wireless repeater 14 is mounted on side wall 16, and includes a first antenna 18 on one side of side wall 16, and a second antenna 20 on an opposite side of side wall 16. First antenna 18 and second antenna 20 are selectively configured depending upon the application. First antenna 18 and second antenna 20 are also preferably substantially impedance matched to one another.

First antenna 18 is mounted on a first dielectric substrate 22, and second antenna 20 is mounted on a second dielectric substrate 24. In the embodiment shown, first antenna 18 and second antenna 20 are encapsulated in a medium dielectric high temperature plastic material defining first dielectric substrate 22 and second dielectric substrate 24 (e.g., Radel™ or polysulfone). The plastic material utilized is preferably a medium dielectric polymer encasing antennas 18 and 20. The plastic material also preferably is hydroscopic (such as Teflon™) such that bacteria cannot become trapped in the small molecular recesses of non-hydroscopic material.

First dielectric substrate 22 and second dielectric substrate 24 are mounted in a sandwiched arrangement on opposite sides of side wall 16 using a plurality of fasteners 26 passing through each of first dielectric substrate 22, side wall 16 and second dielectric substrate 24. To that end, first substrate 22 and second substrate 24 each include two small outboard holes (not referenced, and the exact number may vary) to allow antennas 18 and 20 to be fastened together using fasteners 26 (e.g., riveted or screwed) sandwiching metal side wall 16 between the two antennas 18 and 20, and retaining repeater 14 in place.

An electrical connection 28 interconnects first antenna 18 and second antenna 20. Electrical connection 28 has a length slightly greater than a thickness of side wall 16 such that first antenna 18 lies immediately adjacent to an outside of container 12 and second antenna 20 lies immediately adjacent to the inside of container 12 in a sandwiched arrangement. In the embodiment shown, electrical connection 28 is in the form of a passive connection with a first connector 30 mounted to first antenna 18 and a second connector 32 mounted to second antenna 20. First connector 30 includes at least one pin and/or socket, and second connector 32 includes a mating configuration of at least one pin and/or socket. Preferably, first connector 30 includes a plurality of pins, and second connector 32 includes a plurality of mating sockets. Electrical connection 28 could also be differently configured, such as one or more through pins which are soldered to antennas 18 and 20.

In the specific embodiment shown in FIG. 1, antennas 18 and 20 in the form of RFID antennas have two small mating pins soldered to the pads where the RFID chip would normally be located. A small cylindrical "plug" with two small holes for the connector pins is placed over the pins on antenna 20 and adhesively bonded to the back of the antenna laminate. The length of the cylindrical plugs is the same distance as the thickness of a typical metal enclosure (see FIG. 1). The pins extending from antenna 18 are received within the cylindrical plugs carried on antenna 20.

During operation of the illustrated embodiment, the passive wireless repeater is capable of "retransmitting" a received UHF (e.g., 915 Mhz) signal from outside of a metal enclosure to inside of the enclosure for the purpose of reading the contents of an orthopedic surgical kit that has each item in the contents equipped with an RFID passive tag. The retransmitted signal is modulated by the RFID passive tag inside the enclosure, passing the load variation from the modulation back outside the enclosure to be translated or "read" by the reader device. This repeat function provides the unique ability to read RFID tags located on the inside of a metal enclosure.

In carrying out the repeat function as described above, the electrical or "E" component of an RF wave is utilized. An RF wave includes 2 components; namely, a magnetic flux field (termed an "H" or "M" field) which is purely magnetic in nature, and an electrical field (termed an "E" field) that is the electrical component which is said to be orthogonal to the M field. The M field dissipates energy as a cube function of the range between the reader and the repeater, whereas the E field falls off as a square function of the distance between the reader and the repeater. Because of a typical distance between the reader and repeater, the magnetic flux or "M" field falls off so fast that it is inconsequential. Repeater 14 therefore substantially uses the electrical or "E" field to pass the signal (wave) from outside to inside of container 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A storage container assembly, comprising:
 a container including an exterior metal side wall defining an inside of the container; and
 a passive wireless repeater mounted on said side wall, said repeater including a first antenna on one side of said side wall, a substantially identically configured second antenna on an opposite side of said side wall, a passive electrical connection extending through said wall and directly interconnected between said first antenna and said second antenna, and a dielectric plastic material which hermetically encapsulates said first antenna, said second antenna, and said passive electrical connection, said passive electrical connection being located within said side wall and coupling said first antenna and said second antenna together within said side wall, said passive electrical connection having a length slightly greater than a thickness of said side wall such that said first antenna lies immediately adjacent to an outside of the container and said second antenna lies immediately adjacent to the inside of the container in a sandwiched arrangement, said first antenna and said second antenna facing approximately 180 degrees away from each other, said passive electrical connection, said first antenna and said second antenna coacting together to passively retransmit a signal from an outside of said container to the inside of the container, or vice versa.

2. The storage container assembly of claim 1, wherein said electrical connection includes a first connector mounted to said first antenna and a second connector mounted to said second antenna.

3. The storage container assembly of claim 2, wherein said first connector includes one of a pin and a socket, and said second connector includes one of a mating pin and socket.

4. The storage container assembly of claim 2, wherein said first connector includes a plurality of pins, and said second connector includes a plurality of mating sockets.

5. The storage container assembly of claim 1, wherein said first antenna and said second antenna are substantially impedance matched.

6. The storage container assembly of claim 1, wherein said dielectric plastic material includes a first dielectric substrate and a second dielectric substrate, said first antenna being mounted on said first dielectric substrate, and said second antenna being mounted on said second dielectric substrate.

7. The storage container assembly of claim 6, wherein said first dielectric substrate and said second dielectric substrate are mounted in a sandwiched arrangement on opposite sides of said side wall using a plurality of fasteners passing through said each of said first dielectric substrate, said side wall and said second dielectric substrate.

8. The storage container assembly of claim 6, wherein said first antenna and said second antenna are each RFID antennas.

9. An antenna assembly for use with a storage container including an exterior metal side wall defining an inside of the container, said antenna assembly comprising:
 a first antenna on one side of said side wall of the storage;
 a substantially identically configured second antenna on an opposite side of said side wall;
 a passive electrical connection configured to extend through the wall and directly interconnect between said first antenna and said second antenna, said passive electrical connection being located within said side wall and coupling said first antenna and said second antenna together within said side wall, said passive electrical connection having a length slightly greater than a thickness of the side wall such that said first antenna is positionable immediately adjacent to an outside of the container and said second antenna is positionable immediately adjacent to the inside of the container in a sandwiched arrangement, said first antenna and said second antenna facing approximately 180 degrees away from each other, said passive electrical connection, said first antenna and said second antenna coacting together to passively retransmit a signal from an outside of said container to the inside of the container, or vice versa; and
 a dielectric plastic material which hermetically encapsulates said first antenna, said second antenna, and said passive electrical connection.

10. The antenna assembly of claim 9, wherein said electrical connection includes a first connector mounted to said first antenna and a second connector mounted to said second antenna.

11. The antenna assembly of claim 10, wherein said first connector includes one of a pin and a socket, and said second connector includes one of a mating pin and socket.

12. The antenna assembly of claim 10, wherein said first connector includes a plurality of pins, and said second connector includes a plurality of mating sockets.

13. The antenna assembly of claim 9, wherein said electrical connection is configured to impedance match between said first antenna and said second antenna.

14. The antenna assembly of claim 9, wherein said dielectric plastic material includes a first dielectric substrate and a second dielectric substrate, said first antenna being mounted on said first dielectric substrate, and said second antenna being mounted on said second dielectric substrate.

15. The antenna assembly of claim 14, wherein said first antenna and said second antenna are each RFID antennas.

16. The antenna assembly of claim 1, wherein said passive electrical connection is a passive plug-in type electrical connection.

17. The antenna assembly of claim 9, wherein said passive electrical connection is a passive plug-in type electrical connection.

18. The antenna assembly of claim 1, wherein said container is a medical device container.

19. The antenna assembly of claim 9, wherein the container is a medical device container.

20. The storage container assembly of claim 1, wherein said side wall includes an opening through which said passive electrical connection extends, said first antenna being a single antenna, said second antenna being a single antenna, said first and second antennas being spaced apart and parallel to one another, each of said first and second antennas respectively being centered on said hole such that each of said first and second antennas respectively extends a similar distance away from said hole and thereby said first and second antennas forming an H-configuration together with said passive electrical connection about said hole.

* * * * *